Jan. 28, 1941.  E. C. HORTON  2,230,184
INTERNAL COMBUSTION ENGINE
Filed Aug. 17, 1939
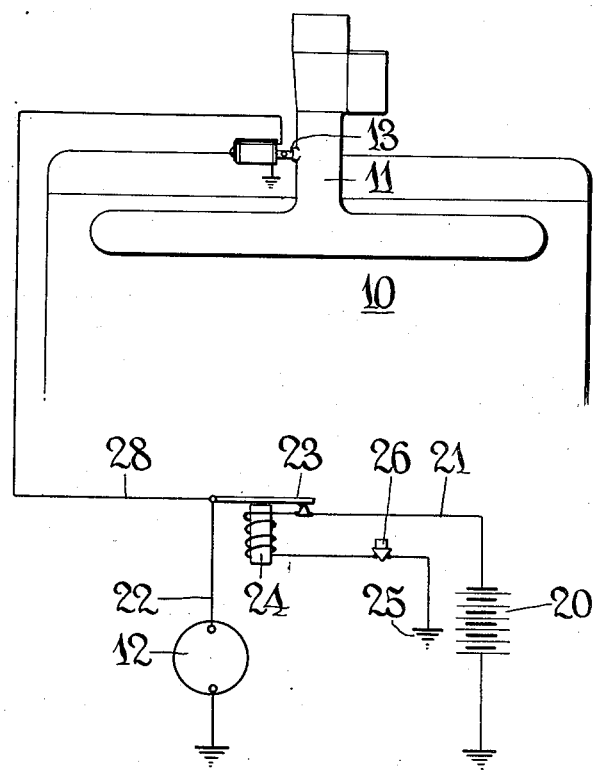
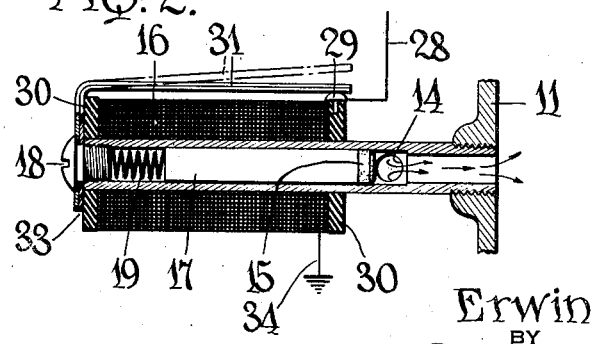
INVENTOR
Erwin C. Horton,
BY
Beau, Brooks, Buckley & Beau.
ATTORNEYS Patented Jan. 28, 1941

2,230,184

UNITED STATES PATENT OFFICE 2,230,184

INTERNAL COMBUSTION ENGINE

Erwin C. Horton, Hamburg, N. Y., assignor to Trico Products Corporation, Buffalo, N. Y.

Application August 17, 1939, Serial No. 290,651

9 Claims. (Cl. 123—179)

This invention relates to improvements in the power plants of motor vehicles and particularly to such power plants as include an internal combustion engine.

In the past some difficulty has been encountered in starting internal combustion engines after they have been running for a time sufficient to bring them to normal operating temperature and have then been stopped for a brief period. This difficulty is attributable to several factors which result in the presence, under such conditions, of too rich a mixture in the intake manifold and in the combustion chambers of the engine cylinders.

The actual contributing factors which bring about the condition described above cannot be stated with absolute certainty, but it is probable that among them is the fact that, when the engine is stopped by turning off the ignition, the engine turns over one or more revolutions through the force of inertia and thereby draws in fuel which is not then subjected to combustion. Again, the fact that the engine is in a heated condition and heats the intake manifold and the carburetor by radiation and conduction promotes vaporization of gasoline which is in the carburetor past the needle valve at the time the engine is stopped.

The carburetor and the intake manifold are, during periods when the engine is in operation, relatively cooler than shortly after the engine has been stopped, due partly to the refrigerating effect of the expansion of air into the carburetor and intake manifold when the engine is running and partly to the current of relatively cool air which is maintained by the engine fan and the motion of the vehicle when the vehicle is in operation.

To obviate the condition complained of in the foregoing I have devised automatic means which insure against and correct the presence of a too rich mixture in the carburetor, the intake manifold and the combustion chambers of the engine cylinders, whenever the temperature prevailing in the region of the intake manifold is high enough to make it likely that there is too great a quantity of vaporized fuel present for satisfactory starting of the engine. This end is accomplished, in accordance with the principles of the present invention, by the provision of means for the admission of fresh, uncarbureted air to the intake manifold during starting operations if and when the temperature in the vicinity of the intake manifold is high enough to indicate that the condition of a too rich mixture will be encountered.

To so control the admission of air a valve is provided which is closed at all times excepting when the electric starting motor is in operation and the engine temperature, or more particularly the temperature prevailing adjacent the intake manifold, is above a predetermined point. The valve to the intake manifold may preferably be controlled by electromagnetic means suitably connected in the conventional starting motor circuit and with a thermostatic switch. While a specific embodiment of apparatus exemplifying the principles of my invention is illustrated in the accompanying drawing, it is to be understood that such modifications as appear desirable to those skilled in the art may be made so long as the spirit or scope of the invention as defined in the appended claims is not departed from.

In the drawing:

Fig. 1 is a general diagrammatic view of one form of the apparatus of my invention; and Fig. 2 is a detailed cross sectional view of the valve means referred to and the electro-magnetic means for controlling the valve.

In the drawing like characters of reference denote like parts and the numeral 10 designates an internal combustion engine having an intake manifold 11. In the illustrated instance I contemplate an engine of the kind conventionally associated with motor vehicles and having an electric starting motor, such starting motor being indicated at 12 in Fig. 1.

To provide for the controlled admission of fresh air into the intake manifold a conduit 13 leads therefrom and has an opening 14 in communication with the atmosphere. The conduit 13 is formed to serve as a valve housing and a cylindrical valve 15 is provided therein. The valve 15 is adapted to be moved axially of the conduit 13 from its illustrated position in Fig. 2 to the right until it closes the opening 14 and thereby prevents further communication of the interior of the conduit 13 and consequently the interior of the intake manifold 11 with the atmosphere.

Movement of the valve 15 is under the control of a solenoid winding 16 disposed about the conduit 13 and a core 17 disposed within the conduit 13 and rigidly connected to the valve 15. The outer end of the conduit 13 is closed as by a screw 18 and a coil spring 19 is disposed between the screw 18 and the adjacent end of the core 17 for normally urging the core 17 and the valve 15 which is fixed thereto to the right as seen in Fig. 2, that is to a closed position with respect to the atmospheric opening 14.

Energization of the solenoid winding 16 attracts the core 17 and moves the core and the valve 15 to the position in which they appear in Fig. 2, whereupon fresh air may be drawn into the intake manifold 11 for entrainment with the vaporized gasoline flowing therethrough. The manner in which the solenoid winding 16 is automatically energized under the conditions previously referred to will now be described.

A conventional storage battery is indicated at 20 in Fig. 1 and a conductor 21, 22 leads from one terminal of the battery to a terminal of the starting motor 12, the opposite terminals of both the battery and the starting motor being grounded in the usual manner. Interposed in the conductor 21, 22 is a conventional starter relay switch 23 and a solenoid for controlling the relay 23 is indicated at 24. The solenoid 24 has one of its terminals connected to the conductor portion 21 and its other terminal is grounded as at 25. Between the solenoid terminal and the ground 25 is a manual switch 26 in the form of the usual starter button. The operation of the portion of the circuit so far described is well known and understood in the art. Closing the starter switch 26 energizes the solenoid 24 causing closure of the relay switch 23 and consequent energization of the starting motor 12.

The relay switch 26 is tapped by a conductor 28 which leads to the valve controlling mechanism illustrated in detail in Fig. 2. While the conductor 28 is shown engaging the starter relay at the starting motor side thereof, it will presently be apparent that the conductor 28 may lead from any part of the conductor portion 22.

Referring again to Fig. 2, the conductor 28 is shown as terminating in a contact element 29 which is disposed upon one of a pair of insulated end members 30 of the solenoid winding 16. Disposed against the other of the end members 30 and secured in position by the screw is a bimetallic element 31 which is so formed that it is adapted to move into and out of contact with the contact element 29 under varying conditions of temperature. In the illustrated embodiment the bimetallic element 31 is arranged to move into contact with the element 29 whenever a predetermined temperature is exceeded and move out of contact with the element 29 when the prevailing temperature is below the predetermined limit.

The bimetallic element serves as a conductor and has electrical connection with one end of the solenoid winding 16 as at 33. The other end of the winding 16 is grounded as indicated at 34. From the foregoing it will appear that the winding 16 will be energized by the storage battery 20 only when the starting motor circuit is closed through closure of the relay switch 23 and when, at the same time, the solenoid circuit is completed through engagement of the bimetallic element 31 with the contact 29.

As has been stated, closure of the solenoid circuit in this manner attracts the valve 15 through its associated solenoid core 17 and moves it to air-admitting position with respect to the conduit 13 and the intake manifold 11. The valve is held in this position electrically, normally until the starting circuit is opened by opening of the starter switch 26, although a sufficient lowering of the engine temperature during the time the starting circuit is closed will likewise have the effect of opening the solenoid winding circuit. Obviously, opening of the solenoid winding circuit results in an immediate return of the valve 15 to closed position under the impetus of the spring 19 and further admission of raw or fresh air to the intake manifold is prevented.

I claim:

1. A motor vehicle having an internal combustion engine propelling engine, a carburetor therefor and an engine starting mechanism, an intake manifold extending between said carburetor and said engine, an air inlet passage formed in said manifold, and means for controlling ingress of air to said manifold through said passage, said means comprising a thermostat and means rendered operative by energization of the engine starting mechanism, said thermostat and last mentioned means cooperating when the temperature adjacent the intake manifold is above a predetermined point and said starting mechanism is operating to admit air to said manifold through said passage.

2. An internal combustion engine having a carburetor and engine starting mechanism associated therewith, an intake manifold extending between said carburetor and said engine, an opening formed in said manifold and valve means for controlling communication of the interior of the intake manifold with the atmosphere through said opening, said valve means being normally closed, and means for positioning said valve means to permit fluid communication through said opening, said means comprising a thermostat and means rendered operative by energization of the engine starting mechanism, said thermostat and said last mentioned means cooperating when the temperature adjacent the intake manifold is above a predetermined point and said starting mechanism is operating to position said valve means to permit fluid communication between the interior of the intake manifold and the atmosphere through said opening.

3. An internal combustion engine having a carburetor and engine starting mechanism associated therewith, an intake manifold extending between said carburetor and said engine, an opening formed in said manifold and valve means for controlling communication of the interior of the intake manifold with the atmosphere through said opening, said valve means being normally closed, means for moving said valve means to permit fluid communication through said opening, said means comprising a solenoid and an electrical circuit therefor, a switch in said circuit which is automatically closed by and during actuation of the engine starting mechanism, and a second thermostatically controlled switch in said circuit and in series with the first mentioned switch and adapted to be closed only when the temperature adjacent the engine is above a predetermined minimum.

4. An internal combustion engine having a carburetor and electrical starting mechanism associated therewith, an intake manifold extending between said carburetor and said engine, an opening formed in said manifold and valve means for controlling communication of the interior of the intake manifold with the atmosphere through said opening, said valve means being normally closed, means for moving said valve means to permit fluid communication through said opening, said means comprising a solenoid and an electrical operating circuit therefor, said circuit being connected in parallel with said electrical starting mechanism, a switch common to said circuit and said starting mechanism, and a second switch in series with said solenoid operating circuit and having thermostatic means causing closure thereof when the surrounding temperature is above a predetermined point.

5. A motor vehicle having an internal combustion propelling engine and a carburetor and an engine starter therefor, a conduit extending between said carburetor and the engine, an air inlet passage formed in said conduit and valve means associated therewith, and means for controlling opening and closing movements of said valve means, said controlling means comprising a thermostat and means rendered operative by energization of the engine starter, said thermostat and said means becoming effective only when the temperature adjacent said conduit is above a predetermined point and said engine starter is active, to open said valve means.

6. A power plant comprising an internal combustion engine having a combustion chamber and a carburetor, means forming a conduit between the carburetor and the combustion chamber and having an opening in the wall thereof, valve means for controlling communication through said opening whereby when said valve is closed said opening is ineffective and when said valve is open atmospheric air is permitted to enter said conduit, electrical means for controlling the disposition of said valve, an activating circuit for said electrical means, and thermostatic means for rendering said circuit open when the temperature in the vicinity of said engine is below a predetermined point, said circuit being controlled by the condition of the circuit for said starting motor and being closeable only when the starting motor circuit is closed.

7. An internal combustion engine having a carburetor and electrical starting mechanism associated therewith, an intake manifold extending between said carburetor and said engine, means effective upon the operation of the starting mechanism for admitting raw, uncarbureted air directly to the intake manifold, and other means for rendering said first mentioned means ineffective.

8. An internal combustion engine having a carburetor and electrical starting mechanism associated therewith, an intake manifold extending between said carburetor and said engine, means effective upon the operation of the starting mechanism for admitting raw, uncarbureted air directly to the intake manifold, and thermostatic means for preventing said first mentioned means from becoming effective excepting when the ambient temperature is above a predetermined value.

9. An internal combustion engine having a carburetor and electrical starting mechanism associated therewith, an intake manifold extending between said carburetor and said engine, an opening formed in said manifold and valve means for controlling communication of the interior of the intake manifold with the atmosphere through said opening, said valve means being normally closed, means for moving said valve means to permit fluid communication through said opening, said means comprising a solenoid and an electrical operating circuit therefor, a switch common to said circuit and said starting mechanism, and a second switch in series with said solenoid operating circuit and having thermostatic means causing closure thereof when the surrounding temperature is above a predetermined point.

ERWIN C. HORTON.